United States Patent
Al-Jlil

(10) Patent No.: US 8,148,296 B2
(45) Date of Patent: Apr. 3, 2012

(54) METHOD OF MAKING A COMPOSITE ADSORBENT FROM NATURAL RAW MATERIAL

(75) Inventor: Saad A Al-Jlil, Riyadh (SA)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 0 days.

(21) Appl. No.: 13/215,203

(22) Filed: Aug. 22, 2011

(65) Prior Publication Data

US 2011/0303612 A1  Dec. 15, 2011

(51) Int. Cl.
*B01J 20/22* (2006.01)
(52) U.S. Cl. ......... 502/401; 502/407; 502/415; 502/439
(58) Field of Classification Search .................. 502/263, 502/439, 400, 401, 407, 413, 414, 415, 417, 502/526
See application file for complete search history.

(56) References Cited

U.S. PATENT DOCUMENTS

| | | | |
|---|---|---|---|
| 4,133,755 A | 1/1979 | Tarao et al. | |
| 5,256,615 A | 10/1993 | Oomura et al. | |
| 5,667,694 A | 9/1997 | Cody et al. | |

OTHER PUBLICATIONS

Yung-Chien Hsu et al., Adsorption Behavior of Basic Dyes on Activated Clay, Separation Science and Technology vol. 32, Issue 15, 1997.
Saad A. Al-Jlil et al. Saudi Arabian clays for lead removal in wastewater, Applied Clay Science 42 (2009) 671-674.
Saad A. Al-Jlil et al. Equilibrium study of adsorption of cobalt ions from waste water using saudi roasted date pits, Resrach Journal of Environmental toxicology 4(1):1-12, 2010.

*Primary Examiner* — Edward Johnson
(74) *Attorney, Agent, or Firm* — Geeta Kadambi; Riddhi IP LLC

(57) ABSTRACT

An adsorbent composition and method of using the adsorbent composite is described. The method for removing heavy metals from contaminated water is done by mixing contaminated water having a concentration of one or more heavy metals with an adsorbent composite comprising granules of a mixture of 50.363 wt % kaolin clay, a 4.477 wt % roasted date pits powder, a 5.54 wt % silica powder a 14.99 wt % magnesite powder and a 24.623 wt % water. After reacting the contaminated water and adsorbent composite together for a specific time the water is filtered and was found to contain reduced amount of heavy metals. The cleaned water can further be used for industrial cooling systems or watering gardens.

8 Claims, 1 Drawing Sheet

METHOD OF MAKING A COMPOSITE ADSORBENT FROM NATURAL RAW MATERIAL

FIELD OF TECHNOLOGY

This disclosure relates generally to method of making and process of using an adsorbent for removing heavy metals from water, and more particularly, to a system and a process of using the adsorbent for decontaminating and reclamation of the industrial waste water containing heavy metal.

BACKGROUND

Water is a precious resource and one of the natural elements that needs to be conserved. Many regions in the world have scare water resources and the heavy industrial use further depletes the natural resource in developed and developing countries. In countries like Saudi Arabia it is critical to manage this resource and maximize the use. In the area of water treatment, such as ground water or industrial waste water treatment, there is an ever-increasing need to remove undesirable and even toxic contaminants, particularly heavy metal contaminants, from water. Many industrial processes utilize aqueous solutions of heavy metals, such as lead in the manufacture of batteries, and chromium or copper in electroplating solutions.

Prior art processes have utilized different types of adsorbents, such as activated carbon, activated sludge, various types of natural clays, carbon aerogels, coirpith carbon, natural zeolites and even date pits. Likewise, heavy metal removal can be accomplished through expensive ion exchange resins.

Prior art references have disclosed several adsorbents such as dithiocarbamate bond-containing low molecular weight compound, amorphous silica and activated carbon powder, granulated with a vinyl acetate polymer binder and clay as a thixotropic excipient (Tarao et al., U.S. Pat. No. 4,133,755), organically modified smectite clay, or organoclay to adsorb heavy metals (Cody et al., U.S. Pat. No. 5,667,694) and Oomura et al., (U.S. Pat. No. 5,256,615) discloses a granular inorganic ion exchanger which is obtained by heating at 400° C. or higher and obtaining a granular mixture from a metal alkoxide such as $Si(OMe)_4$ or hydrolyzate thereof, a clay mineral such as sepiolite and an inorganic ion exchanger such as antimony pentoxide. Unfortunately, the removal of such heavy metals from the water used in these processes has proven to be not only difficult but also expensive.

SUMMARY

The disclosure describes a composition of the adsorbent, a method of making the adsorbent and a process of using the adsorbent for removing heavy metals from water to restore or maintain the basic life-sustaining natural elements, i.e., water. More particularly a method and process for removing the heavy metal from industrial waste water using the adsorbent are described.

In one embodiment, a composition of an adsorbent is disclosed. The composition comprises of mixture of clay, date pit, silica powder, magnesite powder and water. In another embodiment, adsorbent composition comprises of 50-60 wt % clay, 4-5 wt % roasted date pit powder, 5-6 wt % silica powder, 14-15 wt % magnesite powder and 24-25 wt % water.

In another embodiment, the clay has ion-exchange capacity. In another embodiment, the clay may be kaolin clay. In another embodiment, the size range of the adsorbent may be 0.125 mm to 0.25 mm in size. In another embodiment, more specifically the composition of the adsorbent may comprise of a granulated mixture of 50.363 wt % kaolin clay, a 4.477 wt % roasted date pits powder, a 5.54 wt % silica powder, a 14.99 wt % magnesite powder and 24.623 wt % water.

In one embodiment, a method for removing heavy metals from contaminated water is described. In another embodiment, removal of the contaminant heavy metals is carried out by mixing water having a concentration above the specified limits by the local authority of one or more heavy metals. In another embodiment, removal of heavy metal from the water source is carried out by mixing with an adsorbent composition comprising granules of a mixture of 50.363 wt % kaolin clay, a 4.477 wt % roasted date pits powder, a 5.54 wt % silica powder a 14.99 wt % magnesite powder and a 24.623 wt % water; and collecting water having a reduced concentration of the heavy metal(s). The mixing steps carried out at a pH range of 4-5. More specifically at pH>4.

In one embodiment, a method is provided for removing heavy metals from contaminated water is disclosed. In one embodiment, a water containing one or more heavy metals are selected from the group consisting of at least one of a lead, chromium, copper, zinc, cadmium and combinations thereof. In another embodiment, concentration of the one or more heavy metals in the water is at least 1009 ppm. In one embodiment the metal contaminant is lead. In another embodiment the lead concentration as a contaminant in the water is removed by at least 96%.

A system of using the adsorbent to purify the contaminated water is described.

Other features of the present embodiments will be apparent from the accompanying drawings and from the detailed description that follows.

BRIEF DESCRIPTION OF THE DRAWINGS

Example embodiments are illustrated by way of example and not limited in the FIGURE of accompanying drawings, in which like references indicate similar elements and in which.

DETAILED DESCRIPTION

Figure 1:
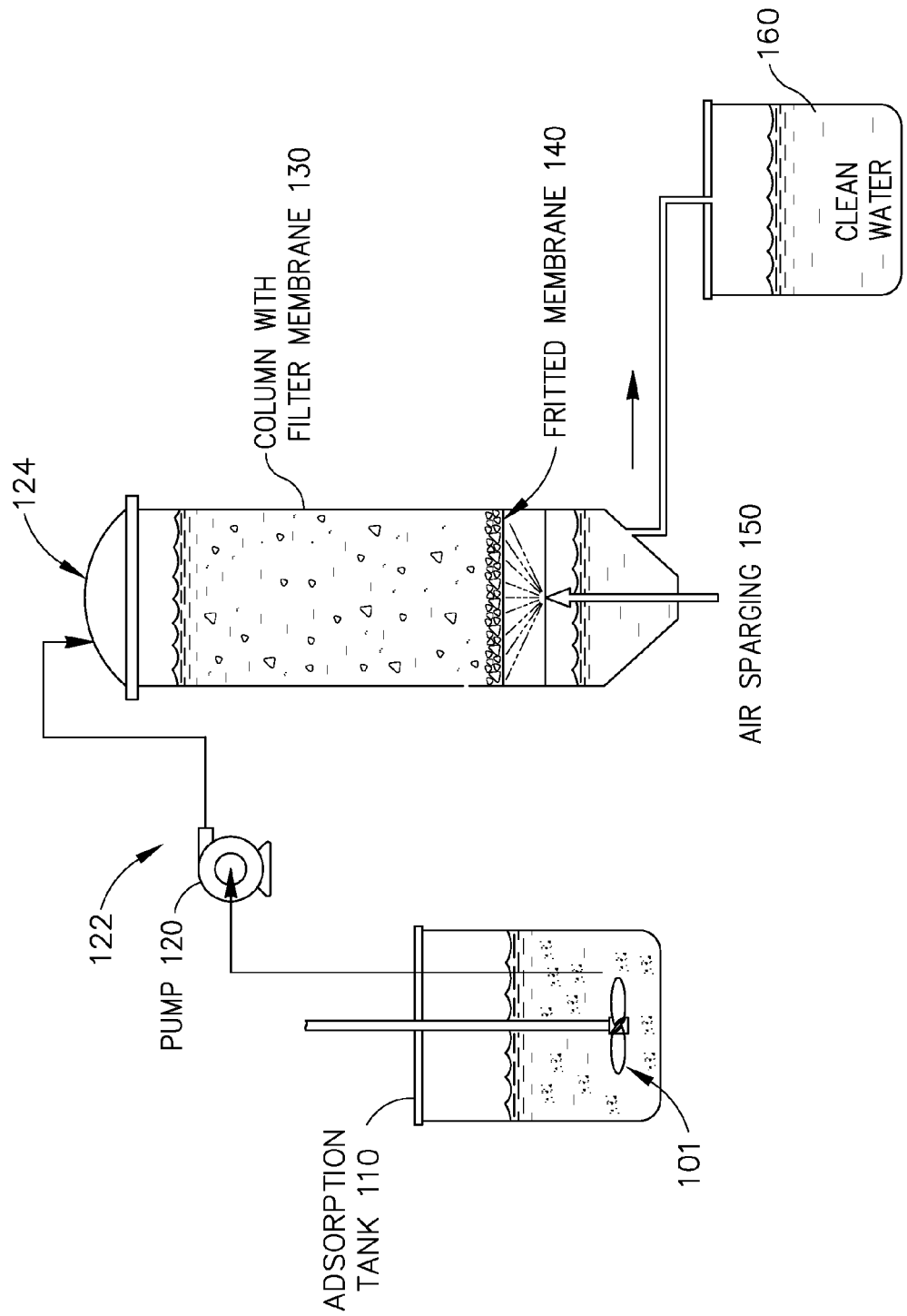
FIG. 1 shows the process of using the adsorption system which consists of a tank with stirrer for mixing the adsorbent with heavy metal ions solution followed by a fritted membrane fixed in a column to separate the adsorbent from the mixed effluent.

The disclosure describes a composition of adsorbent, method of making and process of using the adsorbent for removing heavy metals from water to restore or maintain the basic life-sustaining natural elements, i.e., water.

Composition of the Adsorbent:

Saudi roasted date pits from Qassim Region, Saudi Arabia were used as the adsorbent material. The date pits were roasted at 130° C. for 4 hours and then ground by "Willy Mill" to a particle size below 125 mesh (particles sized between about 0.125 mm to 0.25 mm). The chemical element analysis of the Saudi roasted date pits composition of was done using XRF (Table 1). The physical parameters such as the total surface area, pore diameter and pore volume of Saudi roasted date pits were determined by the surface area analyzer (Table 2). The FT-IR (Fourier-Transform Infrared) of Saudi date pits is shown in Table 3.

TABLE 1

Some selected chemical elements
of Saudi roasted date pits by XRF

| Element | Composition (%) |
|---|---|
| Ca | 28.02 |
| K | 56.77 |
| S | 11.52 |
| Traces of other elements (Mg, Ti, Mn, etc.) | 3.69 |

TABLE 2

Surface area and pore characteristics of Saudi roasted date pits

| Element | Saudi roasted date pits |
|---|---|
| BJH Adsorption cumulative surface area of pores between 17.000 Å and 3000.000 Å diameter ($m^2\,g^{-1}$) | 0.151 |
| BJH Adsorption average pore diameter (Å) | 349.165 |
| BJH Adsorption cumulative volume of pores between 17.000 Å and 3000.000 Å diameter ($cm^3\,g^{-1}$) | 0.001320 |

TABLE 3

Some main functional groups in Saudi roasted date pits

| Observed band ($cm^{-1}$) | Functional group | Contributors |
|---|---|---|
| 3564.16-3022.73 | O—H | Alcohol |
|  | N—H | Amine |
| 2996 | C—H | Alkane |
| 1743 | C=O | Aldehyde, Ketone, Esters |
| 1130 | C—O | Alcohol, Ester, Amide |

Saudi roasted date pits has an inherent ion-exchange capacity at the pH range (3-5). For example, Saudi roasted date pits contains many functional groups (as found by FT-IR, Table 3) such as carboxylic groups. It has been observed that in solution the pH affects the charge on the functional groups. As a result functional groups such as carboxylate are protonated at low pH values (S. A. Al-Jlil 2010). As the pH increases, deprotonation of the functional groups alters/increases and they may become available for metal ion binding. The metal ions are attracted by the negative charge of the functional groups of Saudi roasted date pits, such as carboxylate at alkaline solution when the pH of solution was high. Therefore, in the pH range (3-5) where experiments for the invention were performed, the electrostatic forces between the metal ions and the functional groups are not present and the metal ions can exchange with the proton of the functional groups by an ion exchange process.

Naturally occurring clay has been used in treating water contaminated with heavy metals, since they have an inherent ion-exchange capacity. Clay minerals have been found to be in the form of layered molecular structures, often having variable amounts of iron, magnesium, alkali metals, alkaline earths and other such cations sandwiched between the layers. These cations may perform ion-exchange with heavy metal cations in aqueous solution.

As shown by S. A. Al-Jlil et al. 2009, several naturally occurring Saudi Arabian clay materials were tested for lead adsorption efficiency from wastewater in batch processes. In some experiments, pretreatment of the clay with hydrochloric acid was found to increase lead adsorption efficiency, while other clays performed better in the absence of pretreatment. Additionally, adsorption efficiency was demonstrated to increase with increasing pH of the lead-contaminated water solution.

In the instant disclosure, Silica powder is used as one of the components in the adsorbent composite. The surface of the silica in contact with water is negatively charged at the experimental pH (pH 4-5) (Hsu, Y. C. et al. 1997). So, cationic heavy metals such as lead will undergo attraction on approaching the negative surface of the silica. The metal ions may have attraction force with the negative charge on the surface of the silica. Therefore, the electrostatic forces between the metal ions and the surface of the silica those are present may help to provide an improved adsorbent composite for the instant disclosure.

The major oxide in magnesite is magnesium oxide (MgO). Magnesite powder is used in the adsorbent composite. The surface of the magnesite in contact with water is negatively charged. So, cationic heavy metals such as lead may undergo attraction on approaching the negative surface of the magnesite. The metal ions have attraction forces with the negative charge on the surface of the magnesite. Therefore, the electrostatic forces between the metal ions and the surface of the magnesite are present.

In the instant disclosure a combination of ion-exchange properties of the adsorbent composite in combination with electrostatic qualities are balanced to get an improved adsorbent composite for purifying water contaminated with heavy metals.

Method of Making the Adsorbent:

Each component of the adsorbent composite is processed separately to a particular size or pH, heat treated and/or mixed together to get a final adsorbent composite.

Treatment of Kaolin Clay: Kaolin clay is milled to a size below 125 mesh. The milled clay is then washed with distilled water several times to remove impurities. The washed clay is then dried in a vacuum oven overnight.

Treatment of Date pits: Date pits were roasted at 130° C. for 4 hours and then ground by "Willy Mill" to a particle size below 125 mesh (particles sized between about 0.125 mm to 0.25 mm) to obtain a date pit powder.

Mixing of the Adsorbent composite: Adsorbent composite is made by mixing dried clay, magnesite, silica and roasted date pits powder for 60 minutes. The composites are formulated by mixing 50.363 wt % dried kaolin clay, 4.477 wt % roasted and grounded date pits powder, 5.54 wt % silica powder, and 14.99 wt % magnesite powder to make a mixture. Subsequently, 24.623 wt % of water is added to the dry mixture and mixed again for 60 minutes to make a wet mixture. The wet mixture is then fed to an extruder at a room temperature to make an extrudate. The extrudate is collected in clean vessel, dried at different temperature levels, first temperature at 100° C. for two hours to evaporate the water, then in a second temperature it is increased from 100° C. up to 300° C. for two hours to remove any organic material, then third temperature is increased up to 800° C. for two hours (a set period) left to sit to facilitate the reaction between the materials in the mixture and allow the materials to interact with each others. The reactive adsorbent is thus obtained. Subsequently the reactive adsorbent is ground to granules using different sieve sizes, ranging from 0.125 mm to about 0.25 mm. After the reactive adsorbent has passed through the sieves the final adsorbent composite is obtained. The instant disclosure claims a new adsorbent composite made from the naturally available and low cost raw materials for the treatment of waste water. This is a novel adsorbent composite that may be used for removing metal ions from waste water.

In another embodiment, roasted date pits, magnesite and silica can be used to enhance the removal efficiency of Kaolin clay. Kaolin clay has a metal ion removal efficiency of approximately 48.565%. It is being demonstrated that adding the other components such as 4.477% roasted date pits, 14.99% magnesite and 5.54% silica to the Kaolin clay, the overall efficiency in heavy metal removal from the process stream was increased (up to 96.23%), in another embodiment.

In an effort to increase the kaolin capacity as adsorbent for adsorption of heavy metals from waste water, the research leading to the present invention has prepared a new adsorbent composition for heavy metal ions which are dissolved in aqueous media and better adsorption capacity and removal efficiency than kaolin alone. The enhancement of adsorption capacity by preparing the roasted date pits, magnesite and silica/kaolin clay composite is 49.54% as compare to kaolin alone and the enhancement in removal efficiency is 49.54%. In addition to the average pore width and average pore diameter as shown in the Table below:

TABLE 4

| Type | Maximum capacity (mg/g) | Removal efficiency (%) | average pore width (Å) | average pore diameter (Å) | Enhancement of adsorption capacity % by preparing composite | Enhancement in removal efficiency % by preparing composite | Enhancement in average pore width % | Enhancement in average pore diameter % |
|---|---|---|---|---|---|---|---|---|
| Kaolin | 24.5 | 48.56 | 158.655 | 243.357 | 49.54 | 49.54 | 7.8498 | 24.560 |
| Roasted date pits, magnesite and silica/ kaolin clay composite | 48.55 | 96.23 | 172.170 | 322.585 | | | | |

In one embodiment, an adsorbent composite for metal ions is disclosed comprising a granulated mixture of 50.363 wt % kaolin clay and roasted date pits, silica and magnesite are described. In another embodiment, to enhance such excellent combination of clay particles within the roasted date pits, silica and magnesite, it can be advantageous to mix 24.623 wt % of water, with the clay and roasted date pits, silica and magnesite.

In one embodiment, the method of making the new adsorbent composite is to mill the kaolin clay to a size below about 125 mesh and wash the clay particles with distilled water several times to remove impurities. The milled kaolin clay is then dried in a vacuum oven, e.g., overnight. The dried clay is composited with roasted date pits, silica, magnesite, and water. The blended composite is placed in a mixer to make a paste. The paste is collected after 120 minutes, and then fed to an extruder at a room temperature. The extrudate of the blended adsorbent composite is collected in clean vessel, dried at different temperature levels, first it dried at 100° C. for two hours to evaporate the water, then increase the temperature up to 300° C. for two hours to remove any organic materials, then increase the temperature up to 800° C. for two hours to facilitate the reaction between the materials in the mixture and allow the materials to interact with each others. A reactive adsorbent composite is then ground to granules of different sieve sizes, ranging from 0.125 mm to about 0.25 mm. Then resultant sieved product is finally used as a new adsorbent composite.

Method of Using the Adsorbent:

FIG. 1 shows a batch adsorption system including a tank 110 with stirrer 101 to mix the heavy metal solution with the adsorbent to form a mixed water. The mixed water is pumped 122 using the pump 120 to feed the contaminated water and adsorbent composite as a mixed solution to the column 130. The column 130 has a fritted membrane 140 (having a specific diameter) for further purification of water and to separate the adsorbent from the water. At this stage the heavy metal ions are removed from the wastewater. The waste water may be industrial waste or any other contaminated water. The mixed solution is forwarded to a batch adsorption unit 122 which contains adsorbents. The adsorbents are mixed in the contaminated wastewater and stirred at room temperature and time sufficient to mix the wastewater and the adsorbents. The pH in the column to be used as a batch adsorption unit is maintained at pH above 4, preferably between pH 4 and pH 5, more preferably at about pH 4.5. Subsequently, the treated water is filtered using fritted membrane through pump and the clean water 160 is collected in a separate tank. The water can be used for industrial use or irrigation purposes. Thus metal contaminated water is reclaimed using novel adsorbent composite and natural resource such as water is reclaimed. Air sparging 150 is done using air spargers for back wash to clean the fritted membrane surface from the deposition of the adsorbent composite and move the adsorbent composite back to the tank.

The fritted membrane 140 that is used in the present examples is a Bibby sterilin, 65 mm Pyrex® sintered disc, with porosity=12.28% (grade No. 5) and pore index between 4 microns and 10 microns (available from Bibby sterilin Ltd stone, staffs, St 15 OSA, England). Pyrex® borosilicate glass disc membranes have good chemical and thermal characteristics. Pyrex® borosilicate glass has a good chemical resistance to attack from acids, halogens, salt solutions and organic solvents. Also, Pyrex® has good thermal properties as a result of its low expansion coefficient and high softening point.

However, the fritted membranes suitable for use with the present invention can also be made from other materials, for example ceramic materials, such as alumina, silica or the like in combination with a binder, or even from other glasses, so long as the final fritted membrane has a porosity close that of those disclosed above.

The granulated adsorbent composite may be used as adsorbent for the removal of heavy metal ions, such as Cu, Cr and Pb, from industrial wastewater to obtain clean water for the development of landscape and industrial cooling. It has been observed that the removal efficiency was enhanced to 96%. This allows a cost effective way of removing metal contaminants from water and is much less expensive as compared to other conventional technologies used for wastewater treatment for the removal of heavy metals.

The removal method can be improved by mixing the heavy-metal contaminated water with adsorbent composition. In one embodiment, the solution being treated is maintained at a pH=4.5, and is treated for at least about (4) hours at a room temperature or above.

The removal method, in this embodiment, utilizes clay particles which have a naturally-occurring ion-exchange capacity, such as kaolin clay with 4.477%, roasted date pits, 14.99% magnesite and 5.54% silica. The removal method is effective in removing heavy metals including lead, chromium, copper, zinc, cadmium and combinations thereof. It has been found that when the heavy metal is lead the concentration of lead in the water is reduced by more than 96%.

EXAMPLE 1

Saudi kaolin clay was crushed and milled to a particle size below 125 mesh (particles sized between about 0.125 mm to 0.25 mm), washed with distilled water several times and dried in a vacuum oven over night. One gram of Saudi kaolin clay were mixed with 1009 ppm (first concentration level) Pb solution in a batch process as illustrated in FIG. 1, at 250 RPM, at a temperature of about 25° C. and at pH between about 4-4.5. After treatment the water (for 5 hours) was analyzed and found to contain 519 ppm (second concentration level) of Pb ions, an essentially 48.56% removal efficiency.

EXAMPLE 2

Saudi kaolin clay was crushed and milled to a particle size below 125 mesh (particles sized between about 0.125 mm to 0.25 mm), washed with distilled water several times and dried in a vacuum oven over night. One gram of Saudi kaolin clay were mixed with 998 ppm Cu solution in a batch process as illustrated in FIG. 1, at 250 RPM, at a temperature of about 25° C. and at pH between about 4-4.5. After treatment the water (for 4 hours) was analyzed and found to contain 953 ppm of Cu ions, an essentially 4.51% removal efficiency.

EXAMPLE 3

Saudi kaolin clay in the form of soft rocks was received and milled to a particle size below 125 mesh, washed with distilled water several times and dried in a vacuum oven over night. The dried clay particles were then dry blended with 4.477% Saudi roasted date pits, 14.99% Saudi magnesite and 5.54% Saudi silica and water at about 24.623 wt %.

The mixture was then placed in a mixer and then mixed to make a paste. The paste was extruded then dried, ground into particles sized between about 0.125 mm to 0.25 mm. One gram of adsorbent particles were mixed with 1011 ppm Pb solution in a batch process as illustrated in FIG. 1, at 250 RPM, at a temperature of about 25° C. and at pH between about 4-4.5. After treatment the water (for 10 minutes) was analyzed and found to contain 217 ppm of Pb ions, an essentially 78.54% removal efficiency.

EXAMPLE 4

Saudi kaolin clay in the form of soft rocks was received and milled to a particle size below 125 mesh, washed with distilled water several times and dried in a vacuum oven over night. The dried clay particles were then dry blended with 4.477% Saudi roasted date pits, 14.99% Saudi magnesite and 5.54% Saudi silica and water at of about 24.623 wt %.

The mixture was then placed in a mixer and then mixing to make a paste. The paste was extruded then dried, and ground into particles sized between about 0.125 mm to 0.25 mm. One gram of adsorbent particles were mixed with 960 ppm Pb solution in a batch process as illustrated in FIG. 1, at 250 RPM, at a temperature of about 25° C. and at pH between about 4-4.5. After treatment the water (for 4 hours) was analyzed and found to contain 40 ppm of Pb ions, an essentially 95.83% removal efficiency.

EXAMPLE 5

Saudi kaolin clay in the form of soft rocks was received and milled to a particle size below 125 mesh, washed with distilled water several times and dried in a vacuum oven over night. The dried clay particles were then dry blended with 4.477% Saudi roasted date pits, 14.99% Saudi magnesite and 5.54% Saudi silica and water at about 24.623 wt %.

The mixture was then placed in a mixer and then mixing to make a paste. The paste was extruded then dried, ground into particles sized between about 0.125 mm to 0.25 mm. One gram of adsorbent particles were mixed with 1009 ppm Pb solution in a batch process as illustrated in FIG. 1, at 250 RPM, at a temperature of about 25° C. and at pH between about 4-4.5. After treatment the water (for 5 hours) was analyzed and found to contain 38 ppm of Pb ions, an essentially 96.23% removal efficiency.

EXAMPLE 6

The dried clay particles of Example 3 were dry blended with 4.477% roasted date pits, 14.99% magnesite and 5.54% silica and water at about 24.623 wt %. The mixture was then placed in a mixer and then mixing to make a paste. The paste was extruded then dried, ground into particles sized between about 0.125 mm to 0.25 mm. One gram of adsorbent particles were combined with 50 mL water contaminated with 1009 ppm Pb, in a batch process as illustrated in FIG. 1, at 250 RPM, at a temperature of about 25° C. and at pH between about 4-4.5. After treatment the water (for 5 hours) was analyzed and found to contain 38 ppm of Pb ions, an essentially 96.23% removal efficiency.

EXAMPLE 7

Saudi kaolin clay in the form of soft rocks was received and milled to a particle size below 125 mesh, washed with distilled water several times and dried in a vacuum oven over night. The dried clay particles were then dry blended with 4.477% Saudi roasted date pits, 14.99% Saudi magnesite and 5.54% Saudi silica and water at about 24.623 wt %.

The mixture was then placed in a mixer and then mixing to make a paste. The paste was extruded then dried, ground into particles sized between about 0.125 mm to 0.25 mm. One gram of adsorbent particles were mixed with 980 ppm Cu solution in a batch process as illustrated in FIG. 1, at 250 RPM, at a temperature of about 25° C. and at pH between about 4-4.5. After treatment the water (for 4 hours) was analyzed and found to contain 102.8 ppm of Pb ions, an essentially 89.51% removal efficiency.

The foregoing examples have been provided for the purpose of explanation and should not be construed as limiting the present disclosure. While the present disclosure has been described with reference to an exemplary embodiment, changes may be made within the purview of the appended claims, without departing from the scope and spirit of the present disclosure in its aspects. Also, although the present disclosure has been described herein with reference to particular materials and embodiments, the present disclosure is not intended to be limited to the particulars disclosed herein; rather, the present disclosure extends to all functionally equivalent structures, methods and uses, such as are within the scope of the instant claims. Accordingly, the specification and drawings are to be regarded in an illustrative rather than in a restrictive sense.

What is claimed is:

1. A method of making adsorbent composite, comprising:
   milling a kaolin clay to a size below 125 mesh size;
   washing the kaolin clay after milling several times to remove a impurity;
   drying the kaolin clay after milling and washing;
   roasting the date pits at 130° C. for 4 hours; and
   grounding the date pits after roasting below 125 mesh size to obtain a date pit powder.

2. The method of making adsorbent composite of claim 1, further comprising;
   mixing the kaolin clay after milling, washing and drying with at least one of the date pit powder, a magnesite powder and a silica powder to make a mixture.

3. The method of making adsorbent composite of claim 2, further comprising:
   mixing water to the mixture and allowing it to mix for 60 minutes to make a wet mixture;
   extruding the wet mixture using an extruder and collecting an extrudate;
   drying the extrudate at a first temperature, a second temperature and third temperature to obtain a reactive adsorbent;
   grounding the reactive adsorbent and sieving it to 0.125 mm-0.25 mm range to obtain a adsorbent composite and using the adsorbent composite to purify water.

4. The method of making adsorbent composite of claim 3, wherein the first temperature is 100° C., second temperature is 300° C. and the third temperature is 800° C.

5. The method of making adsorbent composite of claim 3, further comprising:
   sitting the reactive adsorbent for a set period for letting kaolin clay, date pit powder, magnesite and silica powder react with each other.

6. The method of making adsorbent composite of claim 5, wherein the reactive adsorbent is made of the kaolin clay is 50.363 wt %; the roasted date pit is 4.477 wt %; the silica powder is 5.54 wt %; the magnesite powder is 14.99 wt %; and the water is 24.623 wt %.

7. The method of making adsorbent composite of claim 6, wherein an average pore width of the adsorbent composite is 7.8498% greater in comparison with kaolin clay alone.

8. The method of making adsorbent composite of claim 6, wherein an average pore diameter the adsorbent composite is 24.560% greater in comparison with kaolin clay.

* * * * *